United States Patent [19]

Odegaard

[11] Patent Number: 5,760,557
[45] Date of Patent: Jun. 2, 1998

[54] VARIABLE INTERVAL CONTROL DEVICE

[76] Inventor: John I. Odegaard, P.O. Box 60370, Pasadena, Calif. 91116-6370

[21] Appl. No.: 769,421

[22] Filed: Dec. 19, 1996

[51] Int. Cl.⁶ .................. H02P 1/04; B60S 1/08
[52] U.S. Cl. ............ 318/443; 318/444; 318/DIG. 2; 15/250.17
[58] Field of Search .............. 318/440–466, 318/257, 282, 285, 293, DIG. 2; 15/250 C, 250.17

[56] References Cited

U.S. PATENT DOCUMENTS

| | | | |
|---|---|---|---|
| 4,663,575 | 5/1987 | Juzswik et al. | 318/444 |
| 4,689,535 | 8/1987 | Tsunoda et al. | 318/443 |
| 4,689,536 | 8/1987 | Iyoda | 318/483 |
| 4,705,997 | 11/1987 | Juzswik | 318/341 |
| 4,710,878 | 12/1987 | Iyoda | 364/424 |
| 5,648,707 | 7/1997 | Salliotte | 318/443 |

*Primary Examiner*—Paul Ip
*Attorney, Agent, or Firm*—Robert M. Sperry

[57] ABSTRACT

An improved interval control device comprising a timing device; a memory unit; trigger button actuable, a first time, by the user to initiate operation of the desired mechanism and to start said timing device to determine the duration of operation of said desired mechanism; said trigger button being actuable a second time by said user to halt operation of said desired mechanism, to cause said memory unit to store the time of operation indicated by said timing device and to restart said timing device to determine the length of the rest period; said trigger button being actuable by said user a third time to restart operation of said desired mechanism and to cause said memory unit to store the duration of said rest period and, thereafter, to actuate said desired mechanism in accordance with the stored intervals of operation and rest; and a device for ceasing said operation.

9 Claims, 2 Drawing Sheets

VARIABLE INTERVAL CONTROL DEVICE

FIELD OF INVENTION

This invention relates to control devices and is particularly directed to improved means for controlling the initiation and timing of a variable interval mechanism.

PRIOR ART

Many mechanisms are known which operate intermittently with user-variable intervals between the periods of operation. Thus, for example, automotive windshield wipers have variable periods of operation and the controls of such wipers enable the user to select the desired interval between such periods of operation and the duration of the operating period. However, the prior art control devices are not responsive to encountered conditions and, hence, require the user to search for an appropriate setting using a trial and error method. Unfortunately, it often occurs that the settings thus chosen do not correspond with the requirements of the existing weather. Thus, in very light rain or heavy mist, even the longest rest interval may not be sufficient to allow enough moisture to accumulate on the windshield. Consequently, the windshield wiper will be wiping over a partially dry surface, which causes sticking or erratic movement of the wiper blade and tends to scratch the windshield and to reduce the useful life of the wiper blades. On the other hand, in heavier precipitation, yet still too light to warrent switching to continuous operation mode, the shortest rest interval provided by the prior art control devices may delay wiping past the point when it is needed, resulting in inadequate visibility for the driver. Alternatively, once activated, the duration of the operating period may not correspond with the weather requirements. For example, the wiper may make only one or two passes across the windshield when several more are needed or may continue to wipe after all of the water has been removed. In the first instance, the windshield is incompletely cleared, while, in the second, the wiper is wiping over a dry windshield. The only other alternatives are to turn "OFF" the wipers or to set them for continuous operation; neither of which corresponds to the demands of the actual weather. Thus, none of the prior art interval control devices have been entirely satisfactory.

BRIEF SUMMARY AND OBJECTS OF INVENTION

These disadvantages of the prior art are overcome with the present invention and an improved interval control device is provided which enables the user to infinitely vary both the rest intervals and the duration of operation and to be able to reset these at will to suit the existing circumstances.

The advantages of the present invention are preferably attained by providing an improved interval control device comprising a timing device; a memory unit; trigger means actuable, a first time, by the user to initiate operation of the desired mechanism and to start said timing device to determine the duration of operation of said desired mechanism; said trigger means being actuable a second time by said user to halt operation of said desired mechanism, to cause said memory unit to store the time of operation indicated by said timing device and to restart said timing device to determine the length of the rest period; said trigger means being actuable by said user a third time to restart operation of said desired mechanism and to cause said memory unit to store the duration of said rest period and, thereafter, to actuate said desired mechanism in accordance with the stored intervals of operation and rest; and means for ceasing said operation.

Accordingly, it is an object of the present invention to provide an improved interval control device.

Another object of the present invention is to provide an improved variable interval control device.

An additional object of the present invention is to provide an improved variable interval control device for infinitely varying the operation of a desired mechanism at the will of the user.

A further object of the present invention is to provide an improved variable interval control device which enables the user to separately select the durations of the operation and rest periods of a desired mechanism.

Another object of the present invention is to provide an improved variable interval control device which enables the user to infinitely vary both the rest intervals and the duration of operation and to be able to reset these at will to suit the existing circumstances.

A specific object of the present invention is to provide an improved interval control device comprising a timing device; a memory unit; trigger means actuable, a first time, by the user to initiate operation of the desired mechanism and to start said timing device to determine the duration of operation of said desired mechanism; said trigger means being actuable a second time by said user to halt operation of said desired mechanism, to cause said memory unit to store the time of operation indicated by said timing device and to restart said timing device to determine the length of the rest period; said trigger means being actuable by said user a third time to restart operation of said desired mechanism and to cause said memory unit to store the duration of said rest period and, thereafter, to actuate said desired mechanism in accordance with the stored intervals of operation and rest; and means for ceasing said operation.

These and other objects and features of the present invention will be apparent from the following detailed description, taken with reference to the figures of the accompanying drawing.

DETAILED DESCRIPTION OF THE INVENTION

Figure 1:
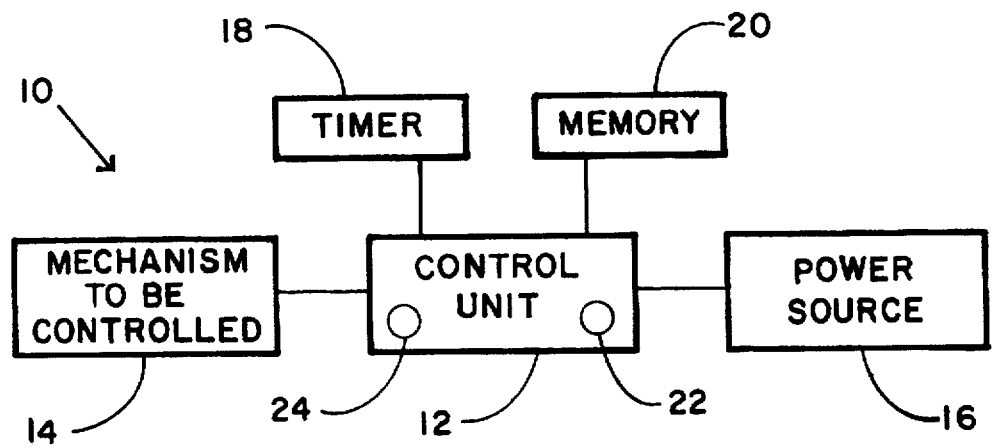
FIG. 1 is a diagrammatic representation showing the variable interval control device of the present invention.

In that form of the present invention chosen for purposes of illustration in the drawing, FIG. 1 shows a variable interval control device, indicated generally at 10, having a control unit 12 for controlling a mechanism 14, such as an automotive windshield wiper, which performs a given repetitive operation at intervals determined by the control unit 12 and for periods of operation whose duration is also determined by the control unit 12. As seen, the control unit 12 is connected between the mechanism 14 and a suitable power source 16 and contains a timer 18 and a memory unit 20 which are activated by a trigger button 22 on the control unit 12. Finally, the control unit 12 has a stop button 24 which serves to halt the operation of the mechanism 14 and to clear the timer 18 and memory unit 20.

In use, since both the durations of both the periods of operation and the rest intervals between operating periods are determined by the control unit 12, the control unit 12 must, initially, be programmed. To accomplish this programming, the user simply presses the button 22. The first time that button 22 is pressed, it begins a period of operation of the mechanism 14 and, also, starts the timer 18. After a desired period of operation, the user presses button 22 a second time. This terminates the period of operation of mechanism 14, causes memory unit 20 to store the time interval indicated by timer 18, and resets timer 18 to start measuring a new time interval. After a desired rest interval, the user presses button 22 a third time. This stops timer unit 18 and causes memory unit 22 to store the second time interval indicated by timer 18 and, also, restarts the mechanism 14. Since timer 18 has now measured a first time interval, corresponding to the desired duration of the operation periods for the mechanism 14, and a second time interval, corresponding to the desired duration of the rest periods, and memory unit 20 has stored both of these time intervals, the control unit 12 will now proceed to operate mechanism 14 in accordance with these time intervals. Since the third actuation of button 22 served to restart the mechanism 14, the control unit 12 will allow the mechanism 14 to operate for the duration of the first time interval and will then halt operation of the mechanism 14 for the duration of the second time interval and will repeat alternating the desired intervals of operation and rest until the user presses the stop button 24, which halts operation of the mechanism 14 and serves to clear the timer 18 and memory unit 20, thereby rearming the control unit 12 for future actuation by the user. Alternatively, the function of stop button 24 can be combined with button 22. Thus, pressing button 22 a fourth time could serve to perform the functions of stop button 24, without requiring a separate button for this purpose.

Figure 2:
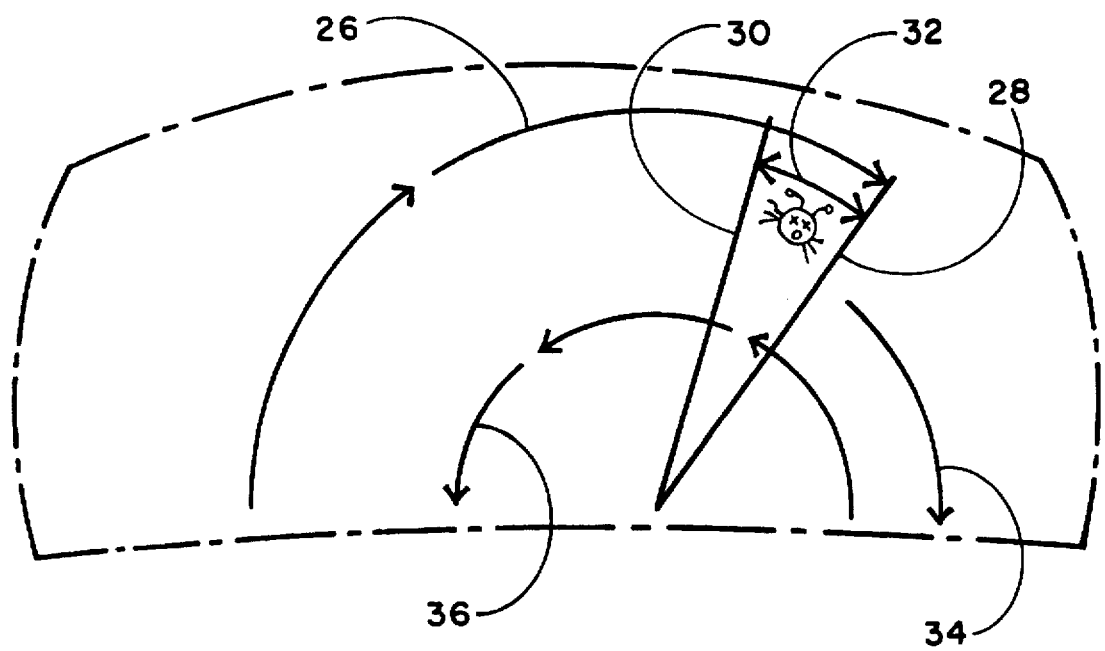
FIG. 2 shows an alternative mode of operation for the control device of FIG. 1.

As seen in FIG. 2, if the user depresses the button 22 and continues to hold it depressed, the control unit 12 will initiate operation of the controlled mechanism 14 until the button 22 is released, whereupon the control unit 12 will cause the controlled mechanism to reverse operation for a predetermined interval, after which the control unit 12 will cause the controlled mechanism 14 to cycle forwardly and rearwardly for a predetermined period. Finally, the control unit 12 will cause the controlled mechanism 14 to complete one cycle of operation and, then, to shut "off". With vehicular windshield wipers, this mode of operation is highly useful for removing insects which have become smashed against the windshield during driving. When the button 22 is pressed, the controlled mechanism 14 (In this instance, a windshield wiper) starts spraying water onto the windshield and causes the wiper blade to begin to sweep arcuately across the windshield, as indicated by arrow 26 in FIG. 3. When the user releases the button 22, as indicated by line 28 of FIG. 3, the control unit 12 causes the controlled mechanism 14 (the windshield wiper) to reverse operation and move rearwardly a predetermined distance, for example, an arc of 15%, as indicated by line 30 in FIG. 3, and, thereafter to cycle several times between positions 28 and 30, as indicated by arrow 32. Finally, the control unit 12 causes the controlled mechanism 14 to complete one full cycle of operation, as indicated by arrow 34 and, then, to shut "off" and return to the original rest position, as indicated by arrow 36. This mode of operation enables the user to select a specific area of the windshield to receive cleaning attention. Thus, if an insect smashes against the windshield, the user can actuate this mode of operation to move the windshield wiper to the area of the windshield where the insect has impacted and can cause the wiper to move back and forth over this area to remove the insect before it can dry and harden.

Figure 3:
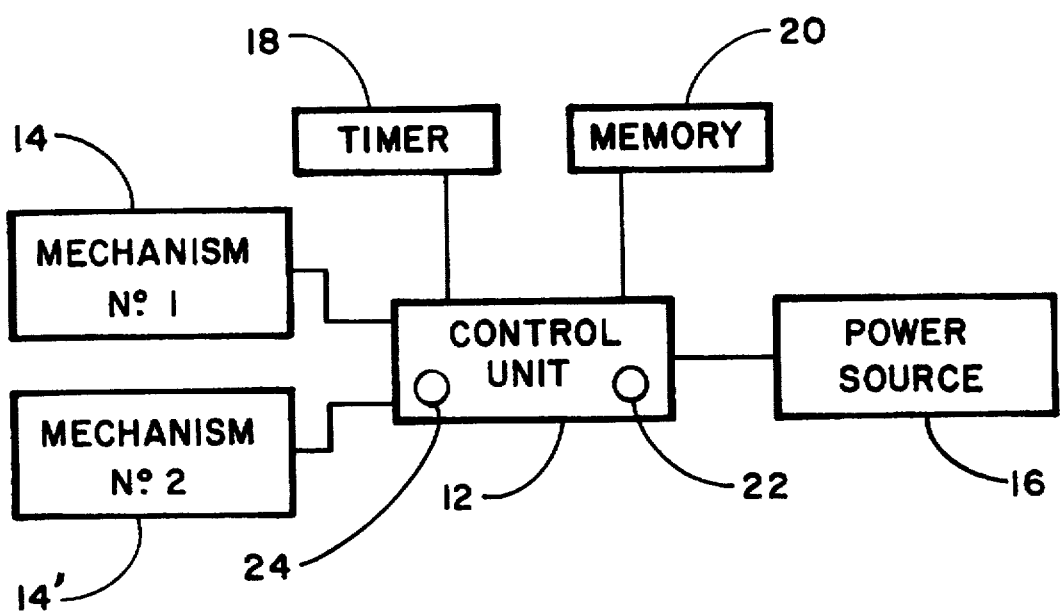
FIG. 3 shows an alternative form of the control device of FIG. 1.

FIG. 3 shows an alternative form of the variable interval control device 10 for regulating operation of two mechanisms 14 and 14' by means of control unit 12. With this form of the variable interval control device 10, pressing button 22 the first time starts mechanism 14 and timer 18 to start measuring a first operating period. Pressing button 22 a second time stops mechanism 14, causes memory unit to store the first time interval measured by timer 18 and resets timer 18 to start measuring a second time interval. Pressing button 22 a third time starts mechanism 14', causes memory unit 20 to store the second time interval measured by timer 18 and resets timer 18 to measure a third time interval. Pressing button 22 a fourth time halts the operation of mechanism 14', causes memory unit 20 to store the third time interval and restarts mechanism 14. The memory unit 20 has now stored the durations of operating periods for both mechanisms 14 and 14' and the duration of the rest period between these operating periods. Thus, since the fourth pressing of button 22 served to restart mechanism 14, the control unit 12 will allow the mechanism 14 to operate for the duration of the first time interval and will then halt operation of the mechanism 14 for the duration of the second time interval and, then will start mechanism 14' for the third time interval and will repeat alternating the desired intervals of operation and rest until the user presses the stop button 24, which halts operation of the mechanism 14' and serves to clear the timer 18 and memory unit 20, thereby rearming the control unit 12 for future actuation by the user.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. An interval control device comprising:

a mechanism to be controlled, a timing device, a memory unit, manually actuable means operable on first actuation for initiating operation of said mechanism and for starting said timing device to measure a first time interval, said manual means being operable upon a second actuation for halting said mechanism, for causing said memory unit to store said first time interval and for restarting said timing device to time a second time interval, said manual means being operable upon a third actuation for causing said memory unit to store said second time interval and for repeatedly initiating operation of said mechanism for operating periods equal to said first time interval and subsequently halting said operation for a rest period equal to said second time interval, and means for halting said operation and for clearing said timing device and said memory unit.

2. An interval control device comprising:

at least one mechanism to be controlled;

a timing device;

a memory unit;

trigger means manually actuable, a first time, to initiate a first operating period of said mechanism and to start said timing device to determine the duration of first operating period of said mechanism; said trigger means being actuable a second time by said user to halt operation of said mechanism, to cause said memory unit to store the time of said first operating period indicated by said timing device, and to restart said timing device to determine the length of the rest period; said trigger means being actuable by said user a third time to start a second operating period of said mechanism and to cause said memory unit to store the duration of said rest period and, thereafter, to repeatedly actuate said mechanism in accordance with the stored intervals of operation and rest; and means for ceasing said operation and for clearing said timing device and said memory unit.

3. The control device of claim 2 wherein:

said mechanism performs a first function during said first operating period and performs a different function during said second operating period.

4. The control device of claim 2 wherein:

said mechanism performs the same function during both said first and second operating periods.

5. The control device of claim 2 wherein:

said means for ceasing said operation is a fourth actuation of said trigger means by said user.

6. The control device of claim 1 wherein:

said mechanism is a vehicular windshield wiper.

7. An interval control device comprising:

at least two mechanisms to be controlled;

a timing device;

a memory unit;

trigger means manually actuable, a first time, to initiate a period of operation of a first of said mechanisms and to start said timing device to determine the duration of operation of said first mechanism; said trigger means being manually actuable a second time to halt operation of said first mechanism, to cause said memory unit to store the time of said first operating period indicated by said timing device, and to restart said timing device to determine the length of the rest period; said trigger means being manually actuable a third time to start an operating period of a second of said mechanisms and to cause said memory unit to store the duration of said rest period and, thereafter, to repeatedly actuate said mechanisms in accordance with the stored intervals of operation and rest; and means for ceasing said operation and for clearing said timing device and said memory unit.

8. The control device of claim 2 wherein:

said trigger means is actuable to initiate operation of said mechanism and, upon a signal from said trigger means, to cause said mechanism to reverse opeation for a predetermined interval.

9. The control device of claim 2 wherein:

said trigger means is actuable to initiate operation of said mechanism and, upon a signal from said trigger means, to cause said mechanism to reverse opeation for a first predetermined interval and, subsequently, to cycle forwardly and rearwardly for a second predetermined period of operation.

* * * * *